US012770573B2

(12) United States Patent
Lin et al.

(10) Patent No.: US 12,770,573 B2
(45) Date of Patent: Oct. 20, 2026

(54) DISPLAY CIRCUITRY WITH COMPLEMENTARY LOW POWER DRIVING SCHEME

(71) Applicant: Apple Inc., Cupertino, CA (US)

(72) Inventors: Chin-Wei Lin, San Jose, CA (US); Ran Tu, Palo Alto, CA (US); Shinya Ono, Santa Clara, CA (US); Fan Gui, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 60 days.

(21) Appl. No.: 19/057,789

(22) Filed: Feb. 19, 2025

(65) Prior Publication Data

US 2025/0349259 A1 Nov. 13, 2025

Related U.S. Application Data

(60) Provisional application No. 63/645,862, filed on May 11, 2024.

(51) Int. Cl.
*G09G 3/3266* (2016.01)

(52) U.S. Cl.
CPC ... *G09G 3/3266* (2013.01); *G09G 2320/0233* (2013.01); *G09G 2320/0247* (2013.01)

(58) Field of Classification Search
CPC .............................................. G09G 3/30–3291
See application file for complete search history.

(56) References Cited

U.S. PATENT DOCUMENTS

| | | | | |
|---|---|---|---|---|
| 9,324,261 B2 | 4/2016 | Lee | | |
| 9,983,604 B2 | 5/2018 | Lee et al. | | |
| 10,755,622 B2 | 8/2020 | Kong et al. | | |
| 11,727,866 B2 | 8/2023 | Kim | | |
| 2006/0156121 A1* | 7/2006 | Chung | G09G 3/3233 | 714/726 |
| 2010/0220039 A1* | 9/2010 | Park | H02M 3/1588 | 315/176 |
| 2012/0069059 A1* | 3/2012 | Lee | G09G 3/3225 | 345/76 |
| 2023/0081342 A1* | 3/2023 | Lin | G09G 3/3233 | 345/211 |
| 2024/0321197 A1* | 9/2024 | Shang | G09G 3/3233 | |
| 2024/0428711 A1* | 12/2024 | Hao | G09G 3/32 | |

* cited by examiner

*Primary Examiner* — Ke Xiao
(74) *Attorney, Agent, or Firm* — Treyz Law Group; Jason Tsai

(57) ABSTRACT

A display may include an array of pixels. Each pixel in the array may include a light-emitting diode having an anode terminal coupled to a first power supply terminal configured to receive a positive power supply voltage and having a cathode terminal coupled to a second power supply terminal configured to receive a ground power supply voltage. The display can further include a gate driver circuit configured to output a control signal to a row of display pixels in the array. The control signal can be driven between the positive power supply voltage and a low voltage different than the ground power supply voltage.

18 Claims, 7 Drawing Sheets

DISPLAY CIRCUITRY WITH COMPLEMENTARY LOW POWER DRIVING SCHEME

This application claims the benefit of U.S. Provisional Patent Application No. 63/645,862, filed May 11, 2024, which is hereby incorporated by reference herein in its entirety.

BACKGROUND

This relates generally to electronic devices with displays and, more particularly, to displays such as organic light-emitting diode (OLED) displays.

Electronic devices can include displays. For example, cellular telephones and portable computers typically include displays for presenting image content to users. OLED displays have an array of display pixels based on organic light-emitting diodes. In such type of display, each display pixel can include a light-emitting diode and associated thin-film transistors for controlling application of data signals to the light-emitting diode to produce light. It can be challenging to design a satisfactory OLED display for an electronic device.

SUMMARY

An aspect of the disclosure provides display circuitry that includes: an array of display pixels, each of which comprises a light-emitting diode having an anode terminal coupled to a first power supply terminal configured to receive a positive power supply voltage and a cathode terminal coupled to a second power supply terminal configured to receive a ground power supply voltage; and a gate driver circuit configured to output a control signal to a row of display pixels in the array. The control signal can be driven between the positive power supply voltage and an additional voltage such as a low voltage different than the ground power supply voltage. The additional voltage can be less than the ground power supply voltage. The display circuitry can further include a battery supply configured to output a battery supply voltage and a DC-DC power converter configured to receive the battery supply voltage and to output the positive power supply voltage and the ground power supply voltage. The display circuitry can further include a charge pump configured to receive the battery supply voltage and a voltage regulator coupled to an output of the charge pump and configured to output the additional voltage.

An aspect of the disclosure provides display circuitry that includes: an array of display pixels, each of which comprises a light-emitting diode having an anode terminal coupled to a first power supply terminal configured to receive a positive power supply voltage and a cathode terminal coupled to a second power supply terminal configured to receive a ground power supply voltage; and a gate driver circuit configured to output a control signal to a row of display pixels in the array. The control signal can be driven between the positive power supply voltage and the ground power supply voltage. The display circuitry can further include a battery supply configured to output a battery supply voltage and a DC-DC power converter configured to receive the battery supply voltage and to output the positive power supply voltage and the ground power supply voltage.

An aspect of the disclosure provides a display pixel that includes: a light-emitting diode having a cathode coupled to a ground power supply line and having an anode; an emission transistor having a first source-drain terminal coupled to a positive power supply line, a second source-drain terminal coupled to the anode, and a gate terminal configured to receive an emission control signal being operated at a first frequency; and an anode reset transistor having a first source-drain terminal coupled to the anode, a second source-drain terminal coupled to a voltage line on which an anode reset voltage is provided, and a gate terminal configured to receive a scan control signal being operated at a second frequency different than the first frequency. The emission transistor can be a p-type silicon transistor, whereas the anode reset transistor can be an n-type semiconducting oxide transistor. The first frequency at which the emission control signal is being operated can be an integer multiple of the second frequency at which the scan control signal is being operated.

DETAILED DESCRIPTION

Figure 1:
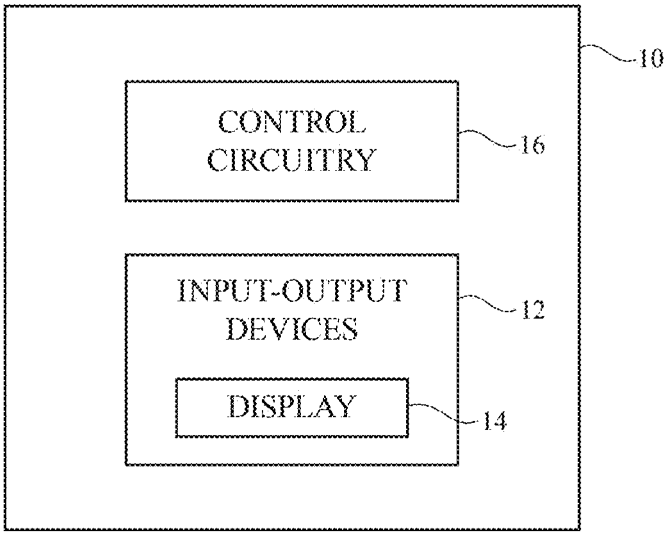
FIG. 1 is a diagram of an illustrative electronic device having a display in accordance with some embodiments.

An illustrative electronic device of the type that may be provided with a display is shown in FIG. 1. As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, application processors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Control circuitry 16 may be used to run software on device 10 such as operating system code and applications. During operation of device 10, the software running on control circuitry 16 may display images on display 14 using an array of pixels in display 14. Device 10 may be a tablet computer, laptop computer, a desktop computer, a display, a cellular telephone, a media player, a wristwatch device or other wearable electronic equipment, or other suitable electronic device.

Display 14 may be an organic light-emitting diode display or may be a display based on other types of display technology. Configurations in which display 14 is an organic light-emitting diode (OLED) display are sometimes described herein as an example. This is, however, merely illustrative. Any suitable type of display may be used in device 10, if desired.

Display 14 may have a rectangular shape (i.e., display 14 may have a rectangular footprint and a rectangular peripheral edge that runs around the rectangular footprint) or may have other suitable shapes. Display 14 may be planar or may have a curved profile.

Figure 2:
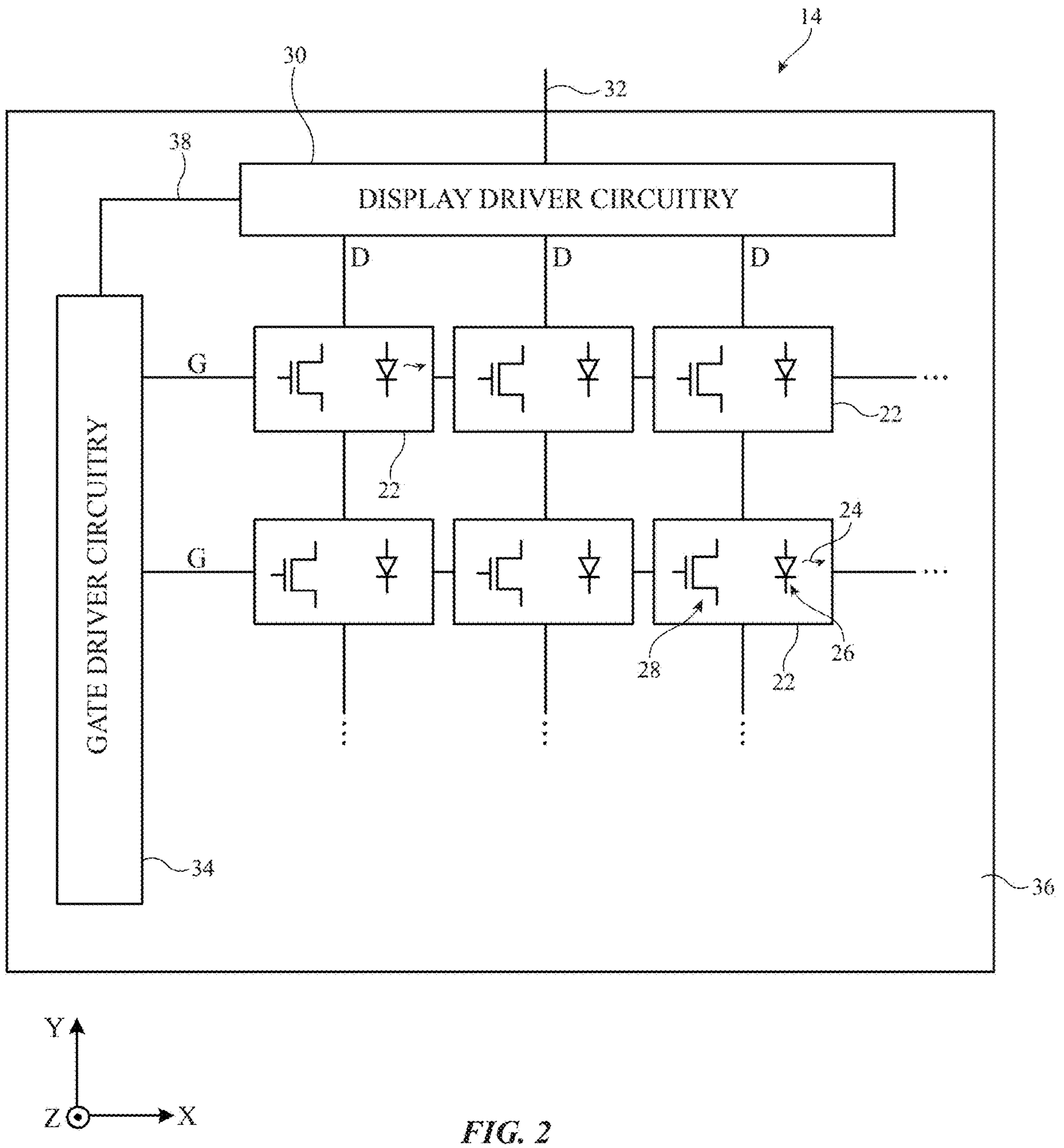
FIG. 2 is a diagram of an illustrative display having an array of organic light-emitting diode (OLED) display pixels in accordance with some embodiments.

A top view of a portion of display 14 is shown in FIG. 2. As shown in FIG. 2, display 14 may have an array of pixels 22 formed on a substrate 36. Pixels 22 can be referred to as display pixels. Substrate 36 may be formed from glass, metal, plastic, ceramic, porcelain, or other substrate materials. Pixels 22 may receive data signals over signal paths such as data lines D (sometimes referred to as data signal lines, column lines, etc.) and may receive one or more control signals over control signal paths such as horizontal control lines G (sometimes referred to as gate lines, scan lines, emission lines, row lines, etc.). There may be any suitable number of rows and columns of pixels 22 in display 14 (e.g., tens or more, hundreds or more, or thousands or more).

Each pixel 22 may have a light-emitting diode 26 that emits light 24 under the control of a pixel control circuit formed from thin-film transistor circuitry such as thin-film transistors 28 and thin-film capacitors). Thin-film transistors 28 may be polysilicon thin-film transistors, semiconducting oxide thin-film transistors such as indium zinc gallium oxide transistors, or thin-film transistors formed from other semiconductors. Pixels 22 may contain light-emitting diodes of different colors (e.g., red, green, and blue) to provide display 14 with the ability to display color images.

Display driver circuitry 30 may be used to control the operation of pixels 22. The display driver circuitry 30 may be formed from integrated circuits, thin-film transistor circuits, or other suitable electronic circuitry. Display driver circuitry 30 of FIG. 2 may contain communications circuitry for communicating with system control circuitry such as control circuitry 16 of FIG. 1 over path 32. Path 32 may be formed from traces on a flexible printed circuit or other cable. During operation, the control circuitry (e.g., control circuitry 16 of FIG. 1) may supply circuitry 30 with information on images to be displayed on display 14.

To display the images on display pixels 22, display driver circuitry 30 may supply image data to data lines D (e.g., data lines that run down the columns of pixels 22) while issuing clock signals and other control signals to supporting display driver circuitry such as gate driver circuitry 34 over path 38. If desired, display driver circuitry 30 may also supply clock signals and other control signals to gate driver circuitry 34 on an opposing edge of display 14 (e.g., the gate driver circuitry may be formed on more than one side of the display pixel array).

Gate driver circuitry 34 (sometimes referred to as horizontal line control circuitry or row driver circuitry) may be implemented as part of an integrated circuit and/or may be implemented using thin-film transistor circuitry. Horizontal/row control lines G in display 14 may carry gate line signals (scan line control signals), emission enable control signals, and/or other horizontal control signals for controlling the pixels of each row. There may be any suitable number of horizontal control signals per row of pixels 22 (e.g., one or more row control lines, two or more row control lines, three or more row control lines, four or more row control lines, five or more row control lines, etc.).

Figure 3:
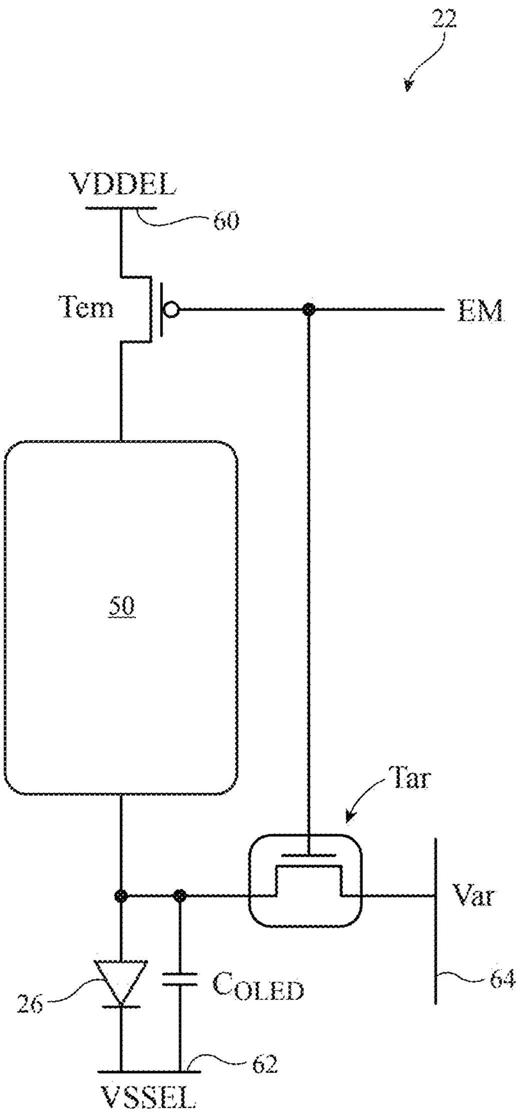
FIG. 3 is a diagram of an illustrative display pixel with a complementary emission driving scheme in accordance with some embodiments.

FIG. 3 is a diagram of an illustrative display pixel such as pixel 22 in accordance with some embodiments. As shown in FIG. 3, pixel 22 may include a light-emitting diode 26, a thin-film emission transistor such as emission transistor Tem, a thin-film anode reset transistor such as anode reset transistor Tar, and other pixel components 50. Pixel components 50 can generally include one or more thin-film transistors such as a drive transistor, a data loading transistor, an initialization transistor, a bias transistor, one or more capacitors, and/or other pixel switching component(s). Diode 26 can have an associated capacitance illustrated as $C_{OLED}$. Capacitance $C_{OLED}$ may be a parasitic capacitance or can be a separate thin-film capacitor. Diode 26 can have a cathode terminal coupled to a ground power supply line 62 (e.g., a ground line on which ground power supply voltage VSSEL is provided) and can have an anode terminal coupled to pixel components 50.

Anode reset transistors Tar can be an n-type semiconducting oxide transistor. "Semiconducting oxide transistors" can refer to and be defined herein as thin-film transistors having a channel region formed from semiconducting oxide material (e.g., indium gallium zinc oxide or IGZO, indium tin zinc oxide or ITZO, indium gallium tin zinc oxide or IGTZO, indium tin oxide or ITO, or other semiconducting oxide material). Transistor Tar can have a drain terminal coupled to the anode terminal of diode 26, a source terminal coupled to an anode reset voltage line 64 (e.g., a voltage line on which anode reset voltage Var is provided), and a gate terminal. The terms "source" and "drain" are sometimes used interchangeably when referring to current-conducting terminals of a metal-oxide-semiconductor transistor. The source and drain terminals are therefore sometimes referred to as "source-drain" terminals (e.g., a transistor has a gate terminal, a first source-drain terminal, and a second source-drain terminal). Thus, transistor Tar can have a first source-drain terminal coupled to the anode terminal and a second source-drain terminal coupled to voltage line 64, or vice versa.

The term "activate" with respect to a switch (or transistor) may refer to or be defined herein as an action that places the switch in an "on" or low-impedance state such that the two terminals of the switch are electrically connected to conduct current. Activating a switch can sometimes be referred to as turning on or closing a switch. The term "deactivate" with respect to a switch (or transistor) may refer to or be defined herein as an action that places the switch in an "off" or high-impedance state such that the two terminals of the switch/transistor are electrically disconnected with minimal leakage current. Deactivating a switch can sometimes be referred to as turning off or opening a switch.

A semiconducting oxide transistor is notably different than a "silicon transistor," which can refer to a transistor having a polysilicon channel region deposited using a low temperature process sometimes referred to as LTPS or low-temperature polysilicon. Semiconducting oxide transistors exhibit relatively lower leakage than silicon transistors, so implementing at least some of the transistors within pixel 22 can help reduce flicker and luminance non-uniformity (e.g., by preventing current from leaking away from an internal storage node). If desired, at least some of the transistors within a pixel 22 may be implemented as silicon transistors such that pixel 22 has a hybrid configuration that includes a combination of semiconducting oxide transistors and silicon transistors (e.g., n-type LTPS transistors or p-type LTPS transistors). Pixel components 50 can include one or more semiconducting oxide transistors, one or more silicon transistors, and/or other types of thin-film transistors.

In the embodiment of FIG. 3, emission transistor Tem can be a p-type silicon transistor having a source terminal coupled to a positive power supply line 60 (e.g., a power supply terminal on which positive power supply voltage VDDEL is provided), a drain terminal coupled to pixel components 50, and a gate terminal configured to receive an emission (control) signal EM. Emission signal EM can be a row control signal that is generated by a corresponding emission gate driver that is part of gate driver circuitry 34 (see FIG. 2) disposed along a peripheral edge of the active display area. Implementing emission transistor Tem as a p-type silicon transistor while implementing anode reset transistor Tar as an n-type semiconducting oxide transistor allows both of these transistors to be jointly controlled by emission signal EM.

Configured in this way, emission signal can be asserted (e.g., driven low) to activate transistor Tem while deactivating transistor Tar and can be deasserted (e.g., driven high) to deactivate transistor Tem while activating transistor Tar. This arrangement in which emission signal EM simultaneously controls an n-type switch (e.g., n-channel semiconducting transistor Tar) and a p-type switch (e.g., p-channel silicon transistor Tem) is sometimes referred to herein as a complementary emission driving scheme. Use of a complementary emission driving scheme can be technically advantageous and beneficial to help reduce the number of peripheral gate drivers, row line routing congestion, and power consumption.

Figure 4:
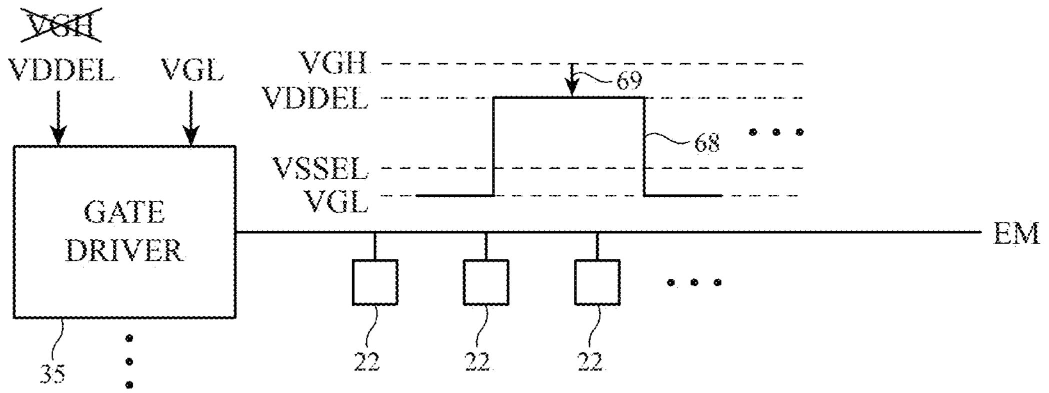
FIG. 4 is a diagram of an illustrative gate driver configured to output an emission control signal to a row of display pixels in accordance with some embodiments.

FIG. 4 is a diagram of an illustrative gate driver circuit such as gate driver 35 configured to output emission signal EM to a row of display pixels 22. Gate driver 35 may represent one row driver in a chain of row drivers within gate driver circuitry 34 shown in FIG. 2. In a typical emission driving scheme, the emission signal is driven between a high voltage VGH and a low voltage VGL. High voltage VGH may be greater than the positive power supply voltage VDDEL powering each pixel 22 (as shown in FIG. 2), whereas low voltage VGL may be less than the ground power supply voltage VSSEL powering each pixel 22. Power supply voltages VDDEL and VSSEL being employed to power pixels 22 can be referred to and defined herein as "pixel supply voltages" (e.g., VDDEL may be a first pixel supply voltage, whereas VSSEL may be a second pixel supply voltage). In contrast, voltages VGH and VGL that are typically employed to power an emission gate driver for driving the emission signal can be referred to and defined herein as "overdrive supply voltages" (e.g., VGH that is greater than VDDEL may be a first overdrive supply voltage, whereas VGL that is less than VSSEL may be a second overdrive supply voltage). Row control signals oftentimes need to be overdriven to VGH and VGL to ensure minimal leakage current in the pixel transistors during operation of the display.

In accordance with some embodiments, the emission gate driver 35 can, instead of being powered by VGH and VGL, be powered by VDDEL and VGL, as shown in FIG. 4 where VGH is crossed out. As a result, the corresponding emission signal EM can be allowed to toggle between the low overdrive supply voltage VGL and the positive pixel supply voltage VDDEL, as illustrated by waveform 68. In other words, the EM waveform 68 does not need to be driven all the way up to VGH (as shown by the reduction of arrow 69). This voltage reduction 69 is allowed here assuming the threshold voltage of transistor Tem is less than −1 V, less than −0.5 V, less than −1.5 V, or other suitable negative voltage. When the threshold voltage of transistor Tem has such values, transistor Tem can be adequately deactivated even when signal EM is driven up to VDDEL instead of VGH.

Although the discussion here is related to the emission signal driving scheme, the techniques employed here can optionally be extended to other row control signals, including complementary scan signals (e.g., for scan signals driving both p-type and n-type transistors).

Figure 5:
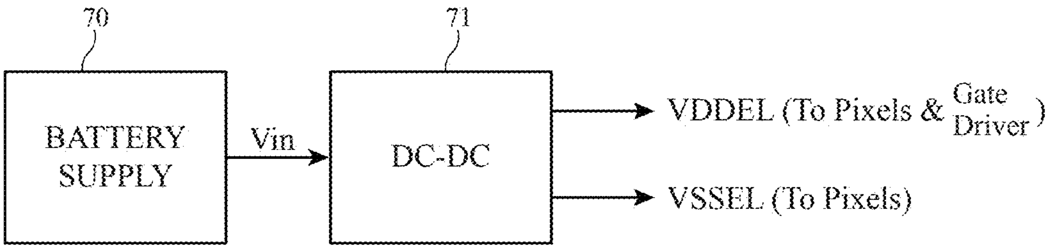
FIG. 5 is a diagram of an illustrative power converter configured to output nominal pixel-level power supply voltages in accordance with some embodiments.

FIG. 5 is a diagram of illustrative power supply circuitry configured to produce the pixel supply voltages VDDEL and VSSEL. The positive pixel supply voltage VDDEL can be used to power each of the pixels 22 in the active display area and can also be used to power the emission gate driver 35 of FIG. 4. The ground pixel supply voltage VSSEL can be used to power each of the pixels 22, but VSSEL is not used to power gate driver 35 or any other gate driver in gate driver circuitry 34.

As shown in FIG. 5, the pixel supply voltages VDDEL and VSSEL can be generated by a power converter such as DC (direct current)-DC power converter 71. Power converter 71 can be a buck (step-down converter), a boost (step-up converter), a buck-boost converter, or other types of power converters. Power converter 71 can receive a system battery supply voltage Vin from a system supply such as battery supply 70 that can be included within device 10 (see FIG. 1). Generation of VDDEL and VSSEL from battery supply voltage Vin using a DC-DC power converter 71 can be performed with relatively high power efficiency (e.g., at 80%+ power efficiency levels).

Figure 6:
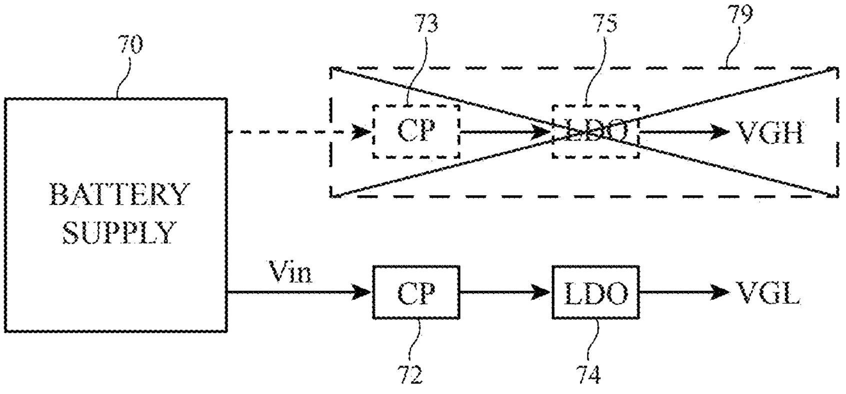
FIG. 6 is a diagram of illustrative charge pump and voltage regulator circuits configured to output a low voltage for a gate driver in accordance with some embodiments.

FIG. 6 is a diagram of illustrative power supply circuitry configured to produce the pixel supply voltages VDDEL and VSSEL. The positive pixel supply voltage VDDEL can be used to power each of the pixels 22 in the active display area and can also be used to power the emission gate driver 35 of FIG. 4. The ground pixel supply voltage VSSEL can be used to power each of the pixels 22, but VSSEL is not used to power gate driver 35 or any other gate driver in gate driver circuitry 34.

As shown in FIG. 6, the low overdrive supply voltage VGL can be generated by a charge pump 72 and a voltage regulator such as low-dropout (LDO) regulator 74. In particular, charge pump 72 can be configured to receive the system battery supply voltage Vin from battery supply 70. Charge pump 72 may have an output that is coupled to LDO regulator 74 (e.g., charge pump 72 and LDO regulator 74 may be connected in series). LDO regulator 74 may have an output on which low overdrive supply voltage VGL is generated. The use of an LDO regulator 74 for producing VGL is exemplary. If desired, other types of voltage regulators can be employed for producing VGL.

Unlike the relatively efficient generation of VSSEL and VDDEL by DC-DC converter 71, generation of VGL (and optionally VGH) from battery supply voltage Vin using associated charge pump and LDO regulator circuitry is performed with comparatively lower power efficiency (e.g., at less than 60% power efficiency levels). As illustrated schematically in FIG. 6, a separate charge pump 73 and LDO regulator 75 that would otherwise be needed for producing the high overdrive supply voltage VGH can be entirely omitted from display 14 since VGH is no longer needed for powering the emission gate driver(s) 35 (see, e.g., crossed-out region 79). Omitting the charge pump and voltage regulator circuitry for generating VGH can be technically advantageous and beneficial since the charge pump and voltage regulator circuitry has low power efficiency, which would otherwise generate excessive heat and waste power.

Figure 7:
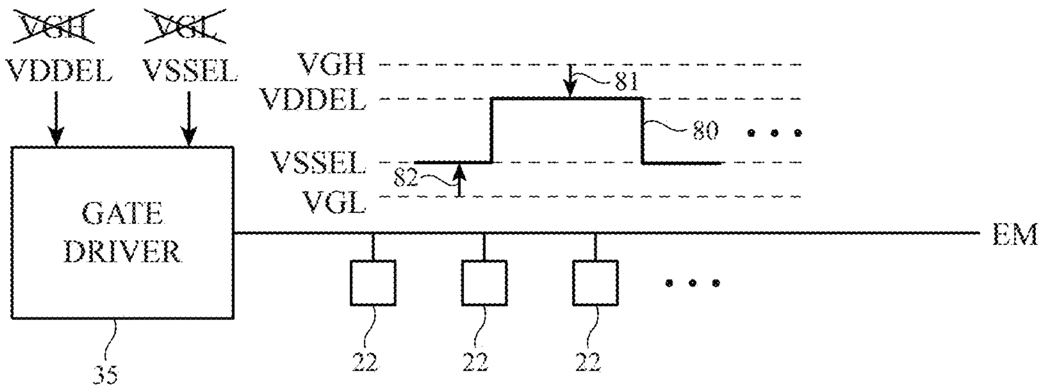
FIG. 7 is a diagram of an illustrative gate driver configured to output an emission control signal to a row of display pixels in accordance with some embodiments.
Figure 8:
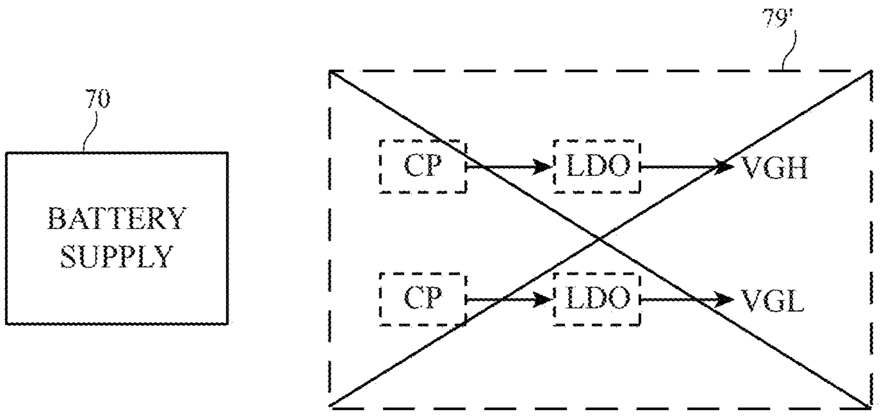
FIG. 8 is a diagram showing how charge pump and voltage regulator circuitry configured to output overdrive power supply voltages can be omitted in accordance with some embodiments.

The embodiment described in connection with FIGS. 4-6 in which the generation of VGH can be omitted is exemplary. FIGS. 7 and 8 illustrate another embodiment in which the generation of both overdrive supply voltages VGL and VGH can be omitted from display 14.

FIG. 7 is a diagram of an illustrative gate driver 35 configured to output emission signal EM to a row of display pixels 22. Gate driver 35 may represent one row driver in a chain of row drivers within gate driver circuitry 34 shown in FIG. 2. In accordance with some embodiments, the emission gate driver 35 can, instead of being powered by VGH and VGL, be powered by the pixel supply voltages VDDEL and VSSEL, as shown in FIG. 7 where VGH and VGL are crossed out. As a result, the corresponding emission signal EM can be allowed to toggle between the ground pixel supply voltage VSSEL and the positive pixel supply voltage VDDEL, as illustrated by waveform 80. In other words, the EM waveform 80 does not need to be driven all the way up to VGH (as shown by the high side reduction 81) and does not need to be driven all the way down to VGL (as shown by the low side reduction 82).

The high side voltage reduction 81 is allowed here assuming the threshold voltage of transistor Tem is less than −1 V, less than −0.5 V, less than −1.5 V, or other suitable negative voltage. When the threshold voltage of transistor Tem has such values, transistor Tem can be adequately deactivated even when signal EM is driven up to VDDEL instead of VGH. On the other hand, the low side voltage reduction 82 is allowed here assuming the threshold voltage of transistor Tar is greater than 0.5V, greater than 0.3 V, greater than 0.7 V, 0.4-0.6 V, greater than 0.6 V, greater than 0.7 V, greater than 0.8 V, greater than 1 V, or other suitable positive voltage. When the threshold voltage of transistor Tar has such values, transistor Tem can be adequately deactivated even when signal EM is driven down to only VSSEL instead of VGL. The positive pixel supply voltage VDDEL and the ground pixel supply voltage VSSEL for power gate driver 35 of FIG. 7 can be generated using the power supply circuitry illustrated in FIG. 5.

Although the discussion here is related to the emission signal driving scheme, the techniques employed here can optionally be extended to other row control signals, including complementary scan signals (e.g., for scan signals driving both p-type and n-type transistors).

Here, since the overdrive supply voltages VGL and VGH are no longer needed for powering gate driver(s) 35, FIG. 8 illustrates how the charge pump and LDO regulator circuitry previously employed for producing VGL and VGH can be entirely omitted from display 14 (see, e.g., crossed-out region 79'). Omitting the charge pump and voltage regulator circuitry for generating VGH and VGL can be technically advantageous and beneficial since the charge pump and voltage regulator circuitry has low power efficiency, which would otherwise generate excessive heat and waste power.

Figure 9:
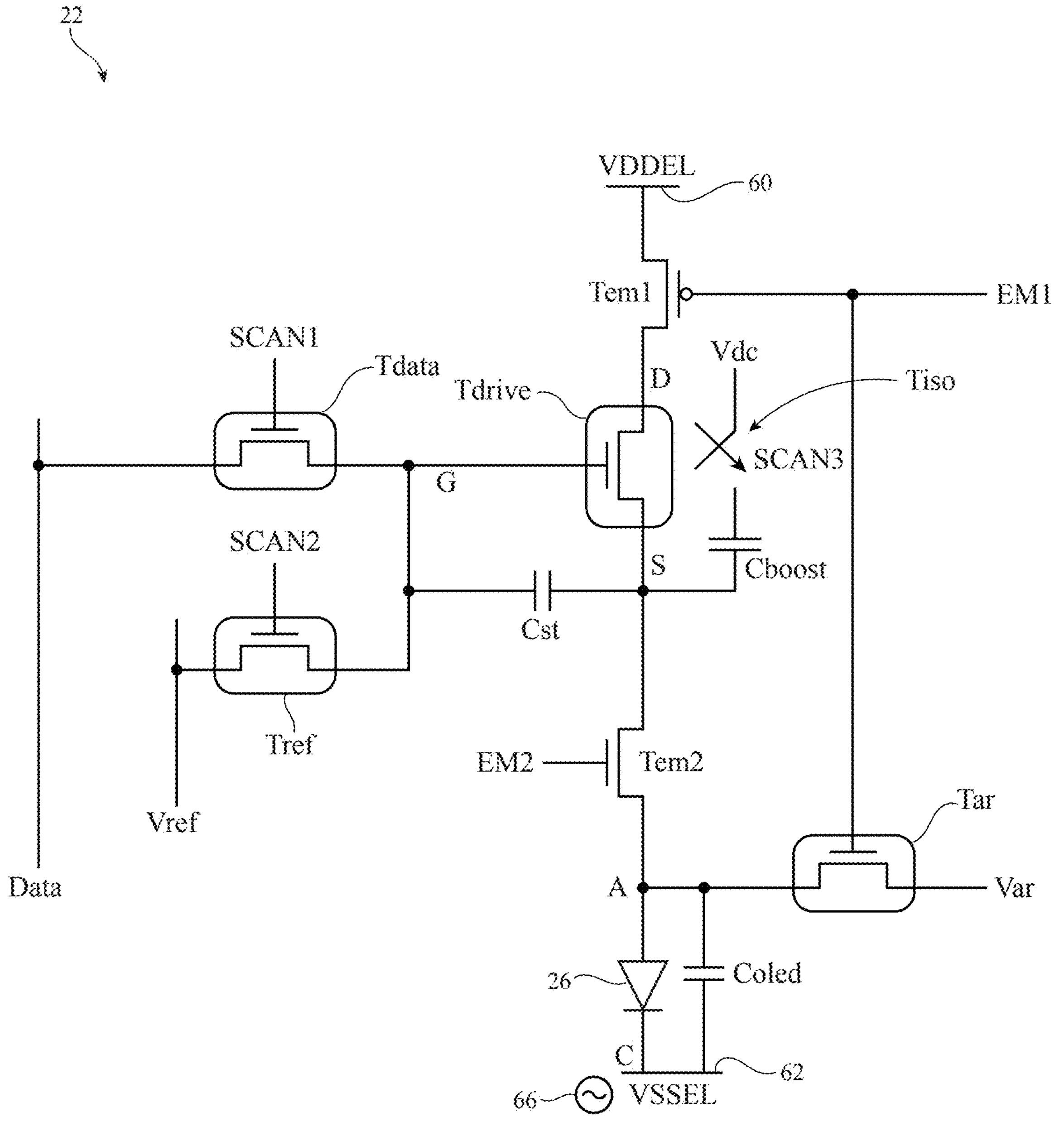
FIG. 9 is a circuit diagram of an illustrative display pixel circuit in accordance with some embodiments.

FIG. 9 is a circuit diagram of an illustrative display pixel circuit 22 in accordance with some embodiments. As shown in FIG. 9, display pixel 22 may include a light-emitting element such as an organic light-emitting diode 26, a capacitor such as storage capacitor Cst, and thin-film transistors such a drive transistor Tdrive, a gate-voltage-setting (or reference) transistor Tref, a data loading transistor Tdata, an anode reset transistor Tar, and emission control transistors Tem1 and Tem2. Emission control transistors Tem1 and Tem2 are sometimes referred to as emission transistors.

At least some or all of the transistors within pixel 22 are semiconducting oxide transistors. If desired, at least some of the transistors within pixel 22 may be implemented as silicon transistors such that pixel 22 has a hybrid configuration that includes a combination of semiconducting oxide transistors and silicon transistors (e.g., n-type LTPS transistors or p-type LTPS transistors). In yet other suitable embodiments, pixel 22 may include additional initialization transistors for apply an initialization or reference voltage to one or more internal nodes within pixel 22. As another example, display pixel 22 may further include additional switching transistors (e.g., one or more additional semiconducting oxide transistors or silicon transistors) for applying one or more bias voltages for improving the performance or operation of pixel 22. Illustrative configurations in which pixel 22 includes both silicon transistors and semiconducting oxide transistors may sometimes be described herein as an example.

In the example of FIG. 9, transistors Tdrive, Tdata, Tref, and Tar are implemented as semiconducting oxide transistors (e.g., n-type semiconducting oxide transistors). Emission transistor Tem1 is implemented as a p-type (p-channel) silicon transistor, whereas emission transistor Tem2 is implemented as an n-type (n-channel) silicon transistor. If desired, transistor Tar can alternatively be implemented as an n-type silicon transistor. In general, n-type semiconducting oxide and silicon transistors are “active-high” devices (e.g., switches that are activated or turned on when the voltage at the gate terminals are driven high), whereas p-type silicon transistors are “active-low” devices (e.g., switches that are deactivated or turned off when the voltage at the gate terminals are driven low).

Drive transistor Tdrive has a gate terminal G, a drain terminal D (sometimes referred to as a first source-drain terminal), and a source terminal S (sometimes referred to as a second source-drain terminal). Transistor Tdrive, emission control transistors Tem1 and Tem2, and light-emitting diode 26 are coupled in series between positive power supply line 60 and ground power supply line 62. Light-emitting diode 26 may have an associated diode capacitance Coled. Emission transistor Tem1 may have a gate terminal configured to receive first emission control signal EM1, whereas transistor Tem2 has a gate terminal configured to receive a second emission control signal EM2. This example in which transistors Tem1 and Tem2 receive different emission signals is merely illustrative. In other embodiments, transistors Tem1 and Tem2 can receive the same emission control signal.

Positive power supply voltage VDDEL may be supplied to positive power supply terminal 60, whereas a ground power supply voltage VSSEL may be supplied to ground power supply terminal 62. Positive power supply voltage VDD may be 3 V, 4 V, 5 V, 6 V, 7 V, 2 to 8 V, greater than 6 V, greater than 8 V, greater than 10 V, greater than 12 V, 6-12 V, 12-20 V, or any suitable positive power supply voltage level. Ground power supply voltage VSSEL may be 0V, −1 V, −2 V, −3 V, −4 V, −5 V, −6V, −7 V, less than 2 V, less than 1 V, less than 0 V, or any suitable ground or negative power supply voltage level. During emission phase, signals EM1 and EM2 can be asserted to turn on transistors Tem1 and Tem2, which allows current to flow from drive transistor Tdrive to diode 26. The degree to which drive transistor Tdrive is turned on controls the amount of current flowing from terminal 60 to terminal 62 through diode 26 and therefore the amount of emitted light from display pixel 22.

In the example of FIG. 9, storage capacitor Cst may be coupled between the gate and source terminals of drive transistor Tdrive. Data loading transistor Tdata may have a first source-drain terminal coupled to the gate terminal of transistor Tdrive, a second source-drain terminal coupled to a data line (e.g., a column line carrying the Data signal), and a gate terminal configured to receive a first scan control signal SCAN1. Transistor Tref may have a first source-drain terminal coupled to the gate terminal of transistor Tdrive, a second source-drain terminal coupled to a reference voltage Vref via a reference voltage line (e.g., a column line carrying reference voltage Vref), and a gate terminal configured to receive a second scan control signal SCAN2. Transistor Tref that is operable to pass reference voltage Vref onto the gate terminal of transistor Tdrive may therefore sometimes be referred to as a gate-voltage-setting transistor. Voltage Vref may be a fixed voltage level that is equal to VDDEL, less than VDDEL, or some other voltage level between VSSEL and VDDEL.

Anode reset transistor Tar may have a first source-drain terminal coupled to the anode terminal of diode 26 (sometimes referred to as the anode electrode), a second source-drain terminal configured to receive an anode reset voltage via an anode reset voltage line (e.g., a column line carrying anode reset voltage Var), and a gate terminal configured to receive first emission control signal EM1. Diode 26 has a cathode terminal (sometimes referred to as the cathode electrode) coupled to VSSEL ground power supply line 62 (sometimes referred to as the common power supply line).

In some electronic devices, the cathode terminal can be subject to noise (see, e.g., cathode noise source 66). This cathode noise 66 might arise due to other signaling components disposed in the vicinity of the display stack, such as from touch sensor electrodes that are sometimes formed overlapping with the cathode layer. Thus, any potential signal perturbations from the overlapping touch sensor electrodes can be inadvertently coupled onto the VSSEL ground line.

Display pixel 22 also includes an additional capacitor Cboost coupled between the source terminal of transistor Tdrive and a direct-current voltage Vdc. Voltage Vdc can be shorted to VDDEL, VSSEL, Vref, Var, or other available/existing DC or static supply voltage within pixel 22. Device configurations in which Vdc is shorted to VDDEL is sometimes described as an example herein. Configured in this way, the drive current of pixel 22 will be proportional to [(Coled+Cboost)/(Cst+Coled+Cboost)]. By appropriately sizing capacitor Cboost, the attenuation of the drive current caused by Coled can be decreased for certain data voltage ranges. Thus, capacitor Cboost serves to boost the drive current levels and is therefore sometimes referred to as a current boosting capacitor.

During emission, cathode noise 66 can be inadvertently coupled to Vdc (e.g., to the VDDEL line) via the diode capacitance Coled and via current boosting capacitor Cboost. Such noise being coupled to Vdc can affect the value of data signals being loaded into pixels 22, which can lead to undesirable display artifacts. To mitigate such potential noise effects, pixel 22 is provided with an isolation device such as isolation switch Tiso coupled in series with capacitor Cboost between the source terminal of transistor Tdrive and the Vdc voltage line. During emission periods, switch Tiso can be deactivated (turned off) to prevent the cathode noise 66 from being coupled to voltage Vdc. By blocking this capacitive coupling path between the cathode and Vdc, any negative or undesirable effects associated with such noise coupling can be mitigated. Switch Tiso is therefore sometimes referred to as a noise blocking, noise isolation, or noise decoupling switch. Switch Tiso can be a semiconducting oxide transistor, an n-type silicon transistor, or a p-type silicon transistor.

The pixel configuration as shown in FIG. 9 is illustrative. In general, display pixel 22 can include additional transistors or capacitors, fewer transistors or capacitors, and can be coupled to one or more other voltage lines configured to carry static or dynamically adjustable voltages.

Figure 10:
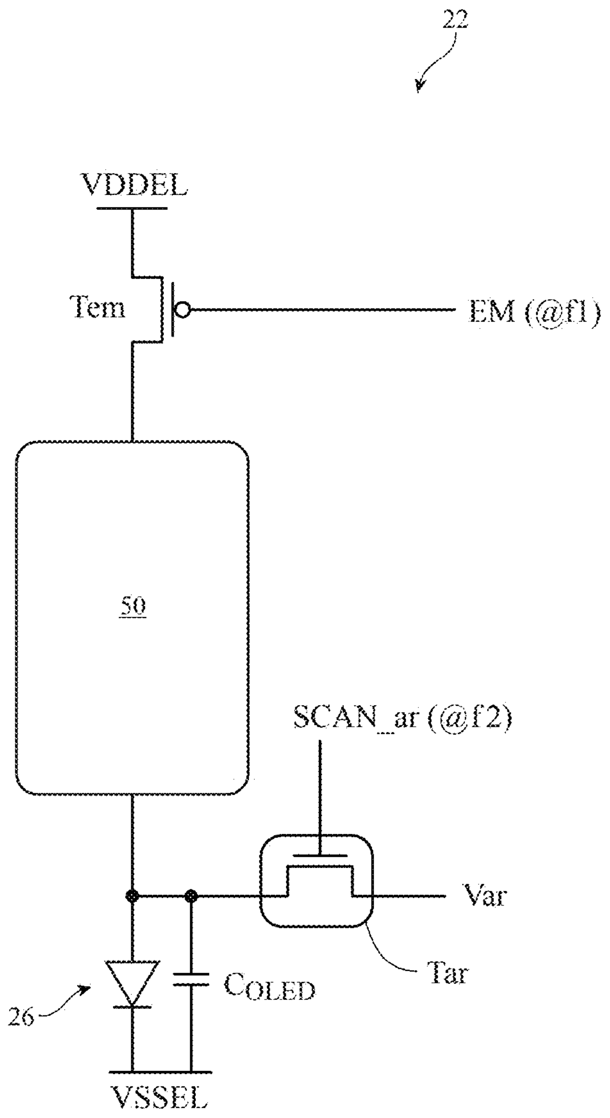
FIG. 10 is a diagram of an illustrative display pixel configured to receive control signals operated at different frequencies in accordance with some embodiments.

The embodiment of FIG. 3 in which the emission transistor Tem and the anode reset transistor Tar are both configured to receive emission signal EM is exemplary. FIG. 10 shows another embodiment of display pixel 22 in which the emission transistor Tem is configured to receive an emission signal EM being operated at a first frequency f1 while the anode reset transistor Tar is configured to receive a scan signal SCAN_ar being operated at a second frequency f2 that is different than f1 (e.g., signal EM toggles or pulses at frequency f1, whereas signal SCAN_ar toggles or pulses at frequency f2). Signal EM can be generated using an emission gate driver, whereas signal SCAN_ar can be generated using a scan gate driver. In accordance with an embodiment, frequency f1 of signal EM may be greater than frequency f2 of signal SCAN_ar. In some embodiments, frequency f1 of signal EM can be an integer multiple of frequency f2 of signal SCAN_ar. As an example, frequency f1 of signal EM can be 480 Hz, whereas frequency f2 of SCAN_ar might be 240 Hz. Driving the EM signal at a higher frequency while keeping the anode reset signal at a lower frequency in this way can be technically advantageous and beneficial operating a large display 14.

The example of FIG. 10 in which the emission signal EM and the scan signal SCAN_ar are being operating at different frequencies is illustrative. In general, two or more control signals within a display pixel 22 can be operated at one or more different frequencies. If pixel 22 receives two or more scan control signals, the scan signals can all be operated at the same frequency or can be operated at two or more different frequencies. If pixel 22 receives two or more emission control signals, the emission signals can all be operated at the same frequency or can be operated at two or more different frequencies. If desired, the emission signal can be operated at a different frequency than at least one of the scan signals controlling pixel 22.

The foregoing is merely illustrative and various modifications can be made to the described embodiments. The foregoing embodiments may be implemented individually or in any combination.

What is claimed is:

1. Display circuitry comprising:

an array of display pixels, each of which comprises a light-emitting diode having:

an anode terminal coupled to a first power supply terminal configured to receive a positive power supply voltage; and a cathode terminal coupled to a second power supply terminal configured to receive a ground power supply voltage; and a gate driver circuit configured to output a control signal to a row of display pixels in the array, wherein the control signal is driven between the positive power supply voltage and an additional voltage less than the ground power supply voltage.

2. The display circuitry of claim 1, wherein each display pixel in the array further comprises:

an emission transistor coupled between the first power supply terminal and the anode terminal of the light-emitting diode, wherein the emission transistor is configured to receive the control signal from the gate driver circuit.

3. The display circuitry of claim 2, wherein each display pixel in the array further comprises:

an anode reset transistor coupled between the anode terminal of the light-emitting diode and a voltage line configured to receive an anode reset voltage, wherein the anode reset transistor is configured to receive the control signal from the gate driver circuit.

4. The display circuitry of claim 3, wherein:

the emission transistor comprises a p-type silicon transistor; and the anode reset transistor comprises an n-type semiconducting oxide transistor.

5. The display circuitry of claim 1, further comprising:

a battery supply configured to output a battery supply voltage; and a DC-DC power converter configured to receive the battery supply voltage and to output the positive power supply voltage and the ground power supply voltage.

6. The display circuitry of claim 5, further comprising:

a charge pump configured to receive the battery supply voltage; and a voltage regulator coupled to an output of the charge pump and configured to output the additional voltage.

7. The display circuitry of claim 6, wherein the voltage regulator comprises a low-dropout regulator.

8. The display circuitry of claim 1, wherein each display pixel in the array further comprises:

a p-type silicon emission transistor coupled between the first power supply terminal and the anode terminal;

a semiconducting oxide drive transistor coupled between the p-type silicon emission transistor and the anode terminal; and an n-type silicon emission transistor coupled between the semiconducting oxide drive transistor and the anode terminal.

9. The display circuitry of claim 8, further comprising:

a semiconducting oxide anode reset transistor coupled between the anode terminal and an anode reset voltage line;

a semiconducting oxide data loading transistor coupled to a gate terminal of the semiconducting oxide drive transistor; and a semiconducting oxide gate-voltage-setting transistor coupled between the gate terminal of the semiconducting oxide drive transistor and a reference voltage line.

10. Display circuitry comprising:

an array of display pixels, each of which comprises a light-emitting diode having:

an anode terminal coupled to a first power supply terminal configured to receive a positive power supply voltage; and a cathode terminal coupled to a second power supply terminal configured to receive a ground power supply voltage; and a gate driver circuit configured to output a control signal to a row of display pixels in the array, wherein the control signal is driven between the positive power supply voltage and the ground power supply voltage.

11. The display circuitry of claim 10, wherein each display pixel in the array further comprises:

an emission transistor coupled between the first power supply terminal and the anode terminal of the light-emitting diode, wherein the emission transistor is configured to receive the control signal from the gate driver circuit.

12. The display circuitry of claim 11, wherein each display pixel in the array further comprises:

an anode reset transistor coupled between the anode terminal of the light-emitting diode and a voltage line configured to receive an anode reset voltage, wherein the anode reset transistor is configured to receive the control signal from the gate driver circuit.

13. The display circuitry of claim 12, wherein:

the emission transistor comprises a p-type silicon transistor; and the anode reset transistor comprises an n-type semiconducting oxide transistor.

14. The display circuitry of claim 10, further comprising:

a battery supply configured to output a battery supply voltage; and a DC-DC power converter configured to receive the battery supply voltage and to output the positive power supply voltage and the ground power supply voltage.

15. The display circuitry of claim 10, wherein each display pixel in the array further comprises:

a p-type silicon emission transistor coupled between the first power supply terminal and the anode terminal;

a semiconducting oxide drive transistor coupled between the p-type silicon emission transistor and the anode terminal; and an n-type silicon emission transistor coupled between the semiconducting oxide drive transistor and the anode terminal.

16. The display circuitry of claim 15, further comprising:

a semiconducting oxide anode reset transistor coupled between the anode terminal and an anode reset voltage line;

a semiconducting oxide data loading transistor coupled to a gate terminal of the semiconducting oxide drive transistor; and a semiconducting oxide gate-voltage-setting transistor coupled between the gate terminal of the semiconducting oxide drive transistor and a reference voltage line.

17. A display pixel comprising:

a light-emitting diode having a cathode coupled to a ground power supply line and having an anode;

an emission transistor having a first source-drain terminal coupled to a positive power supply line, a second source-drain terminal coupled to the anode, and a gate terminal configured to receive an emission control signal being operated at a first frequency, wherein the emission transistor comprises a p-type silicon transistor; and an anode reset transistor having a first source-drain terminal coupled to the anode, a second source-drain terminal coupled to a voltage line on which an anode reset voltage is provided, and a gate terminal configured to receive a scan control signal being operated at a second frequency different than the first frequency, wherein the anode reset transistor comprises an n-type semiconducting oxide transistor.

18. The display pixel of claim 17, wherein the first frequency at which the emission control signal is being operated is an integer multiple of the second frequency at which the scan control signal is being operated.

* * * * *